US009856751B2

(12) United States Patent
Duong et al.

(10) Patent No.: US 9,856,751 B2
(45) Date of Patent: Jan. 2, 2018

(54) NONLINEAR ROLLING BEARING RADIAL SUPPORT STIFFNESS

(71) Applicant: United Technologies Corporation, Hartford, CT (US)

(72) Inventors: Loc Quang Duong, San Diego, CA (US); Xiaolan Hu, San Diego, CA (US); Behzad Hagshenas, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/899,971

(22) PCT Filed: May 30, 2014

(86) PCT No.: PCT/US2014/040186

§ 371 (c)(1),
(2) Date: Dec. 18, 2015

(87) PCT Pub. No.: WO2014/204633

PCT Pub. Date: Dec. 24, 2014

(65) Prior Publication Data

US 2016/0138421 A1 May 19, 2016

Related U.S. Application Data

(60) Provisional application No. 61/837,847, filed on Jun. 21, 2013.

(51) Int. Cl.
*F01D 25/16* (2006.01)
*F16C 19/52* (2006.01)
(Continued)

(52) U.S. Cl.
CPC .......... *F01D 25/164* (2013.01); *F01D 5/027* (2013.01); *F01D 21/04* (2013.01); *F01D 25/04* (2013.01);
(Continued)

(58) Field of Classification Search
CPC .... F16C 19/527; F16C 27/04; F16C 2360/23; F16C 32/0677; F16C 17/035;
(Continued)

(56) References Cited

U.S. PATENT DOCUMENTS 3,005,668 A * 10/1961 Szydlowski .......... F01D 25/164 384/535
3,011,840 A * 12/1961 Littleford ............. F01D 25/164 384/581
(Continued)

FOREIGN PATENT DOCUMENTS

EP 0134749 A2 3/1985

OTHER PUBLICATIONS

International Search Report for International Application No. PCT/US2014/040186.
European Search Report for Application No. 14 81 42 93.

*Primary Examiner* — Marcus Charles
(74) *Attorney, Agent, or Firm* — Cantor Colburn LLP

(57) ABSTRACT

A bearing support assembly includes a squirrel cage defining a longitudinal axis and having a cylindrical portion defining a bearing seat. The squirrel cage is configured and adapted to provide a first level of radial support stiffness between a housing and a bearing seated in the bearing seat. A damper sleeve is operatively coupled to the cylindrical portion of the squirrel cage through a fluid film to dampen relative radial motion between the damper sleeve and the squirrel cage. A radial spring component is operatively connected to a side of the damper sleeve radially opposite the cylindrical portion of
(Continued)

the squirrel cage to provide a second level of radial support stiffness.

13 Claims, 5 Drawing Sheets

(51) Int. Cl.
*F16C 27/04* (2006.01)
*F02C 7/06* (2006.01)
*F01D 5/02* (2006.01)
*F01D 21/04* (2006.01)
*F01D 25/04* (2006.01)

(52) U.S. Cl.
CPC .............. *F01D 25/162* (2013.01); *F02C 7/06* (2013.01); *F16C 27/04* (2013.01); *F16C 27/045* (2013.01); *F05D 2220/32* (2013.01); *F05D 2240/54* (2013.01); *F05D 2260/96* (2013.01); *F16C 19/527* (2013.01); *F16C 2360/23* (2013.01)

(58) Field of Classification Search
CPC .............. F16C 33/3843; F16C 33/4623; F01D 25/162; F01D 25/164; F01D 5/027; F01D 25/04; F02C 7/06; F05D 2220/32; F05D 2240/54; F05D 2260/96
USPC ......... 384/99, 119, 215, 489, 535–537, 581; 415/170.1, 230–231
See application file for complete search history.

(56) References Cited

U.S. PATENT DOCUMENTS 3,994,541 A 11/1976 Geary et al.
4,084,861 A 4/1978 Greenberg et al.
4,440,456 A 4/1984 Klusman
4,605,316 A * 8/1986 Utecht .................... F16C 17/03 384/215
4,872,767 A * 10/1989 Knapp .................. F01D 25/164 384/535
4,952,076 A * 8/1990 Wiley, III ............. F01D 25/164 384/535
4,981,415 A 1/1991 Marmol et al.
5,044,789 A 9/1991 Damon et al.
5,161,940 A * 11/1992 Newland ............... F01D 25/164 415/142
5,201,585 A * 4/1993 Gans ..................... F01D 25/164 384/215
6,325,546 B1 12/2001 Storace
6,682,219 B2 * 1/2004 Alam .................... F01D 25/164 384/581
7,384,199 B2 * 6/2008 Allmon ................. F01D 25/164 384/581
7,546,742 B2 * 6/2009 Wakeman ............. F01D 25/162 60/791
7,634,913 B2 * 12/2009 Singh ...................... F01D 17/02 324/207.19
7,648,277 B2 1/2010 Laurant et al.
7,857,519 B2 12/2010 Kostka et al.
8,727,632 B2 * 5/2014 Do ........................ F01D 25/164 384/472
8,747,054 B2 * 6/2014 Witlicki ................ F01D 25/164 415/119
2002/0067870 A1 * 6/2002 Ommundson ........ F01D 25/164 384/99
2002/0136473 A1 9/2002 Mollmann
2005/0022501 A1 * 2/2005 Eleftheriou ............... F01D 5/22 60/226.1
2006/0083449 A1 * 4/2006 Laurant ................. F16C 33/581 384/99
2007/0084187 A1 * 4/2007 Moniz ..................... F02C 3/067 60/204
2007/0157596 A1 * 7/2007 Moniz ................... F01D 25/164 60/39.162
2009/0110543 A1 4/2009 Alam et al.
2009/0148274 A1 6/2009 Kostka et al.
2010/0027930 A1 * 2/2010 Kinnaird ............... F01D 25/164 384/523
2010/0037462 A1 2/2010 Pettinato et al.
2010/0244602 A1 * 9/2010 Perret ...................... H02K 5/15 310/90
2013/0051982 A1 * 2/2013 Hindle .................. F01D 25/164 415/119
2013/0108202 A1 5/2013 Do et al.

* cited by examiner

NONLINEAR ROLLING BEARING RADIAL SUPPORT STIFFNESS

RELATED APPLICATIONS

This application claims the benefit of and priority to U.S. Provisional Patent Application No. 61/837,847 filed Jun. 21, 2013, the contents of which are incorporated herein by reference.

BACKGROUND OF THE INVENTION

1. Field of the Invention

The present invention relates to bearing support assemblies, and more particularly to bearing support assemblies with radial spring and damping elements.

2. Description of Related Art

A variety of bearings are known for use in supporting rotating components. For example, in gas turbine engines, the spools are supported by bearings for rotation of rotor blades in the compressor and turbine. Over the wide range of operational speed of a gas turbine engine, or other systems with wide ranges of operational speed, it can be beneficial to include mechanical equivalent spring stiffness to the bearing supports to optimize the rotor critical speed system and also to include damping to the spring to reduce rotor radial excursion as it passes through these critical speeds. For example, during startup of a gas turbine engine, the shaft and bearings may pass through two or more critical rotor natural frequencies (called critical speeds). If one or more of these critical speeds presents in the operational speed range, it could damage the engine. Radial springs can be provided to tune these interfered critical speeds outside of the operational speed range. The damper element is added to the spring to soften and/or dampen the effects of resonance to allow the engine to pass through these critical frequencies without damage.

SUMMARY OF THE INVENTION

An embodiment includes a squirrel cage defining a longitudinal axis and having a cylindrical portion defining a bearing seat. The squirrel cage is configured and adapted to provide a first level of radial support stiffness between a housing and a bearing seated in the bearing seat. A damper sleeve is operatively coupled to the cylindrical portion of the squirrel cage, e.g., through a fluid film, to dampen relative radial motion between the damper sleeve and the squirrel cage, and hence that of the rotor. A radial spring component is operatively connected to a side of the damper sleeve radially opposite the cylindrical portion of the squirrel cage to provide a second level of radial support stiffness, in which the squirrel cage and the radial spring component form a spring system in parallel whose equivalent radial stiffness is the sum of the two individual stiffnesses.

To prevent damper fluid leakage, seals can be provided at the two ends of the squeeze film damper land. The squirrel cage can be mounted to a housing with the damper sleeve and radial spring component radially between the housing and the cylindrical portion of the squirrel cage. For example, the squirrel cage can be radially inside the damper sleeve, and the radial spring component can be radially outside the damper sleeve. The radial spring component can be positioned radially between the damper sleeve and the housing to radially bias the damper sleeve apart from the housing to provide the second level of radial support stiffness.

In certain embodiments, the radial spring component is an annular wave spring with a plurality of radially outer lands for pressing outward, e.g., against the housing, and a plurality of radially inner lands for pressing inward, e.g., against the damper sleeve. The inner lands alternate circumferentially with the outer lands. It is contemplated that the squirrel cage can have a spring constant lower than that of the radial spring component for applying the first level of radial stiffness support before the second level of radial stiffness support. The wave spring can be a complete wave ring, a split wave ring, a circumferentially segmented wave ring, or any other suitable configuration.

In accordance with certain embodiments, an axially spaced apart pair of seal rings seal a damper fluid chamber defined between the squirrel cage and the damper sleeve. The damper sleeve can include a recessed channel that forms part of the damper fluid chamber, to provide damper fluid storage. To prevent the squirrel cage and damper sleeve from bottoming out or from metal to metal contact, in which the oil film thickness is zero, the squirrel cage outer land, e.g., the cylindrical portion of the squirrel cage, includes two bumpers or steps at two respective ends thereof on the outside of the seal rings. The height of the bumpers is equal to the minimum fluid film radial clearance.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
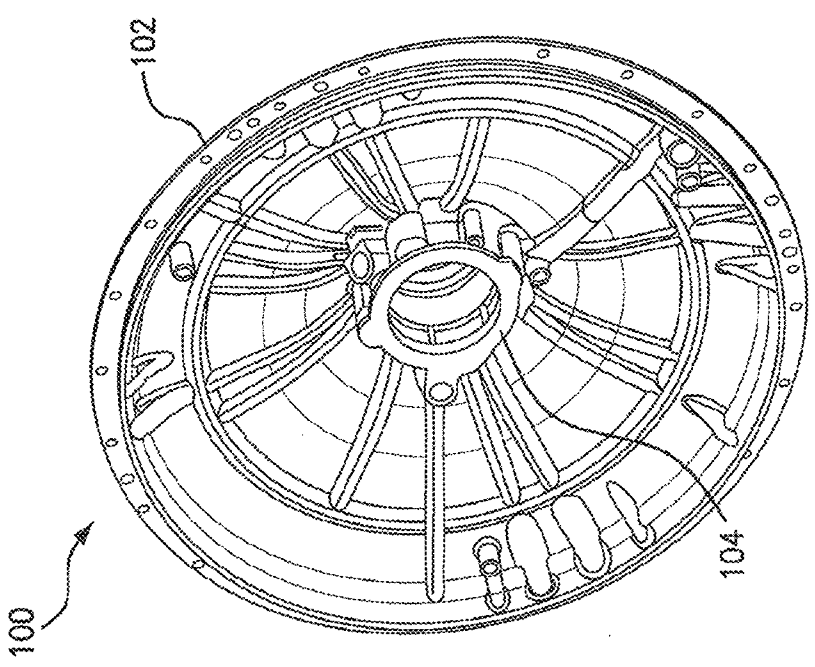
FIG. 1 is a perspective view of an embodiment of a bearing support assembly, showing the inlet housing and a squirrel cage for supporting a bearing of a rotary shaft.

Reference will now be made to the drawings wherein like reference numerals identify similar structural features or aspects of the subject disclosure. For purposes of explanation and illustration, and not limitation, a partial view of an exemplary embodiment of a bearing support assembly in accordance with the disclosure is shown in FIG. 1 and is designated generally by reference character 100. Other embodiments of support structures in accordance with the disclosure, or aspects thereof, are provided in FIGS. 2-6, as will be described. The systems and methods of this disclosure can be used to provide nonlinear stiffness to rolling bearing supports, for example to improve performance in gas turbine engines by providing an appropriate level of bearing support stiffness for different operational conditions such as warm startup, in which the engine is subjected to heat soak-back resulting in excessive rotor thermal bow and casing asymmetric deflection, as well as for cold engine start-up and steady state operation.

Figure 2:
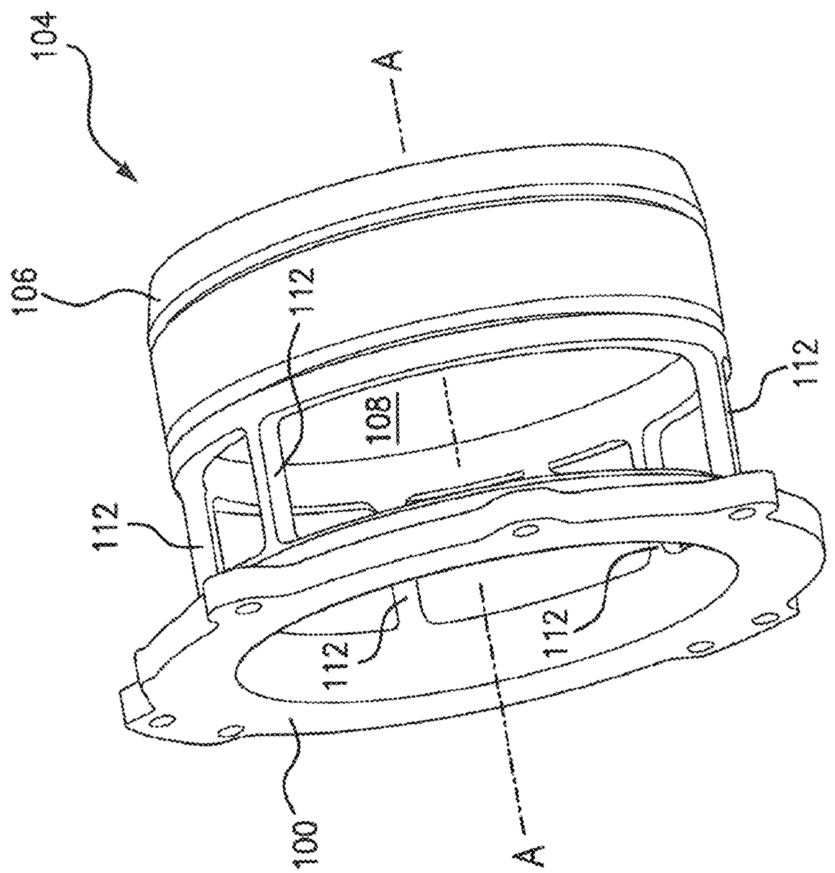
FIG. 2 is a perspective view of the squirrel cage of FIG. 1, showing the squirrel cage beams for providing a first level of spring stiffness to the support structure, according to an embodiment.

Bearing support assembly 100 includes a housing 102 and a squirrel cage 104 mounted to housing 102. As shown in FIG. 2, squirrel cage 104 defines a longitudinal axis A and includes a cylindrical portion 106 that defines a bearing seat 108 therein. Squirrel cage 104 also includes a bolting flange 110 connected to cylindrical portion 106 by cage beams 112. Cage beams 112 are relatively flexible and therefore allow for squirrel cage 104 to act as a spring between housing 104 and bearing 114, which is schematically shown seated in bearing seat 108 in FIG. 3. The spring characteristic of cage beams 112 mean that squirrel cage 104 is configured and adapted to provide a first level of radial support stiffness between housing 102 and bearing 114.

Figure 3:
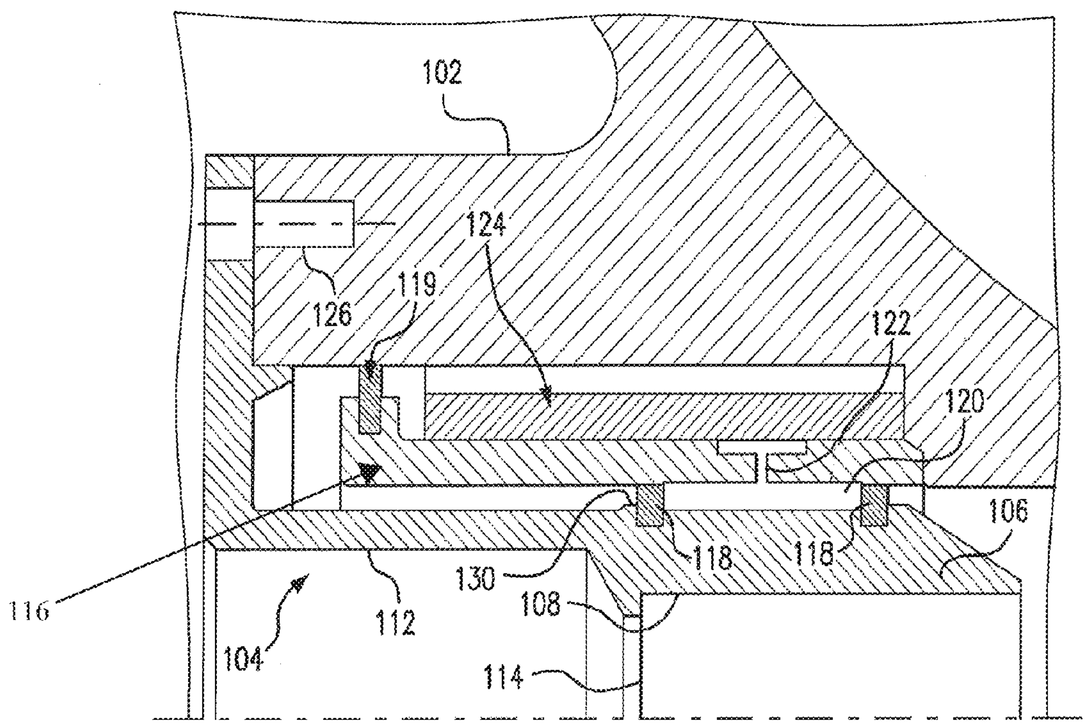
FIG. 3 is a cross-sectional side elevation view of the squirrel cage of FIG. 1, showing the radial wave spring between the housing and the damper sleeve, according to an embodiment.

Referring now to FIG. 3, a damper sleeve 116 is operatively coupled to the cylindrical portion 106 of squirrel cage 104, via a fluid film. The fluid is squeezed to dampen relative radial motion between damper sleeve 116 and squirrel cage 104. An axially spaced apart pair of seal rings 118 seal a damper fluid chamber 120 defined between squirrel cage 104 and damper sleeve 116. Seal rings 118 prevent leakage of damper fluid to the two ends of the squeeze film damper, e.g., chamber 120. Damper sleeve 116 includes a recessed channel 122 that forms part of damper fluid chamber 120. The squeeze film thickness is represented by the vertical span of fluid chamber 120 as oriented in FIG. 3. A small bumper or step 130 on squirrel cage 104 adjacent to seal rings 118 allows for a minimum oil film even when seal rings 118 are fully compressed, for example when squirrel cage 104 comes into metal to metal contact with damper sleeve 116. Thus, bumper or step 130 prevents squeeze film damper bottom out in the adverse conditions of excessive rotor excursion such as during engine warm restart. Seal ring 119 is used to prevent damper fluid leakage from the cavity containing wave spring 124.

Squirrel cage 104 is mounted to housing 102, e.g., by bolts 126, with damper sleeve 116 and a radial spring component, namely wave spring 124, radially between housing 102 and cylindrical portion 106 of squirrel cage 104. Wave spring 124 is operatively connected the side of damper sleeve 116 radially opposite cylindrical portion 106 of squirrel cage 104 to provide a second level of radial support stiffness. In the exemplary embodiment shown, squirrel cage 104 is radially inside damper sleeve 116, and wave spring 124 is radially outside damper sleeve 116. With wave spring 124 positioned radially between damper sleeve 116 and housing 102, wave spring 124 can radially bias damper sleeve 116 apart from housing 102 to provide the second level of radial support stiffness beyond the first level of radial support stiffness provided by squirrel cage 104.

Figure 4:
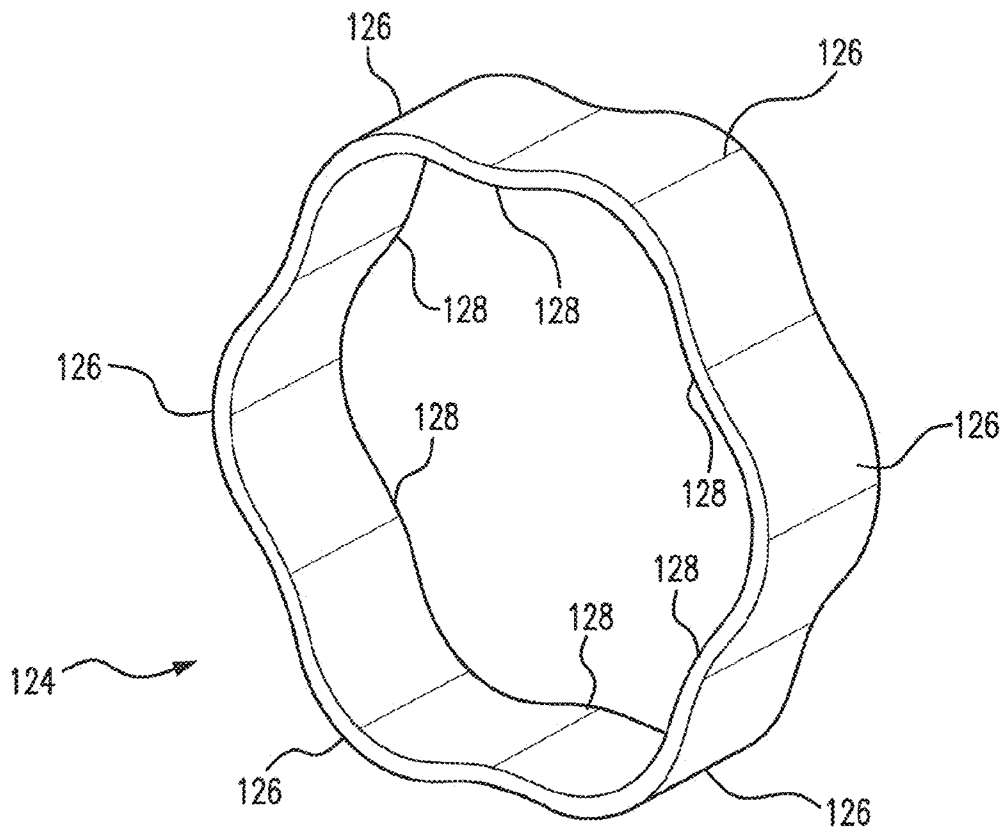
FIG. 4 is a perspective view of the radial wave spring of FIG. 3, showing the inner and outer lands for radial spring support, according to an embodiment.
Figure 5:
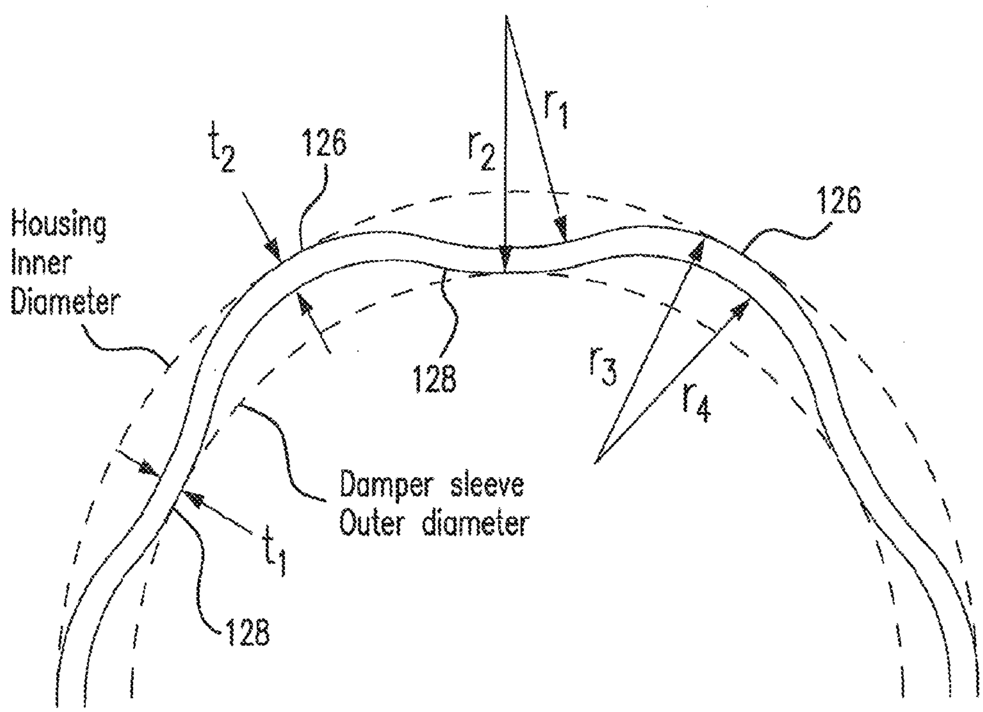
FIG. 5 is a cross-sectional end elevation view of a portion of the radial wave spring of FIG. 3, showing geometric parameters for configuring the wave spring, according to an embodiment.

Referring now to FIG. 4, wave spring 124 is an annular wave spring with a plurality of radially outer lands 126 for pressing outward, e.g., against housing 102, and a plurality of radially inner lands 128 for pressing inward, e.g., against damper sleeve 116. Inner lands 128 alternate circumferentially with outer lands 126 around the circumference of wave spring 124. FIG. 5 shows wave spring 114 with the inner diameter of housing 102 and the outer diameter of damper sleeve 116 indicated schematically to show how the waves of wave spring 124 provide spring resilience therebetween. The specific geometry of wave spring 124 is exemplary only. Various geometric parameters can be varied as needed to be suitable for specific applications. For example, the number of waves can be varied, as can the inner and outer radii $r_1$ and $r_2$ of the inner lands 128, the outer and inner radii $r_3$ and $r_4$ of outer lands 126, the thickness $t_1$ of inner lands 128, and the thickness $t_2$ of outer lands 126, to provide suitable spring performance tailored for specific applications. The axial length of wave spring 124 can also be varied, affecting spring performance as suitable for specific applications.

Squirrel cage 104 has a spring constant lower than that of wave spring 124 for applying the first level of radial stiffness support before the second level of radial stiffness support. This provides nonlinear stiffness that can be tailored to specific applications to provide adequate support under changing conditions. For example, in an embodiment where bearing support assembly 100 is used to support a rotor bearing in a gas turbine engine, squirrel cage 104 provides a first level of bearing support stiffness that is relatively soft for accommodating critical speed conditions where vibrations occur as the rotor accelerates and decelerates. The second level of stiffness is provided by wave spring 124 when squirrel cage 104 bottoms out against damper sleeve 116, for example during significant radial excursions of the rotor shaft such as during a warm start up where uneven heating bows the rotor shaft together with housing deflections. The second level of stiffness provides some cushioning to prevent the rotor from rubbing until equilibrium conditions prevail and the squirrel cage can resume providing the first level of stiffness. In the second level of bearing support stiffness the squirrel cage spring and wave spring 124 form a parallel spring system in which the overall bearing support stiffness is the sum of the two individual spring stiffnesses. This stiffness is provided under certain adverse conditions of high rotor excursions. Without the contribution of wave spring 124, the squirrel cage would be pressed against the damper sleeve. Having the spring action of squirrel cage 104 and wave spring 124 decoupled/disengaged allows the squirrel cage to provide relatively soft support for normal operation, so the desirable rotor dynamic characteristics are not perturbed during normal operation.

Figure 6:
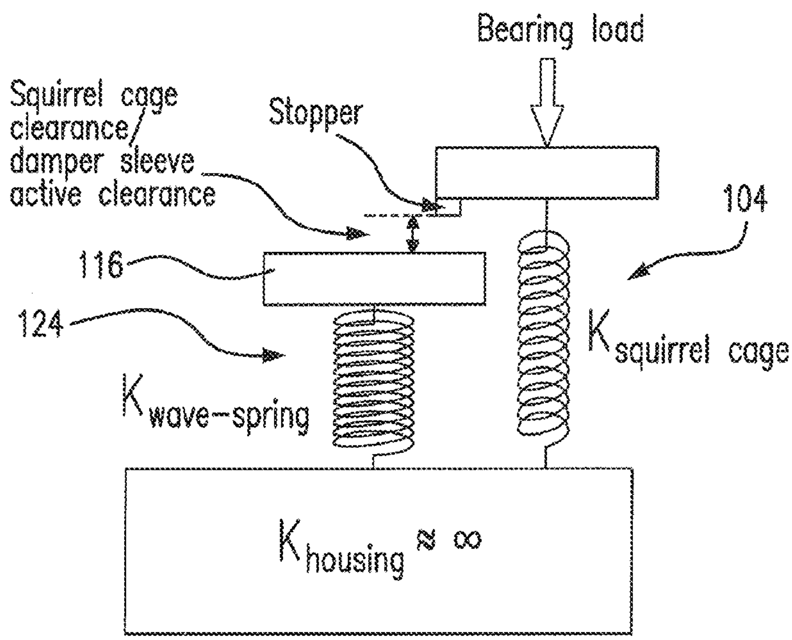
FIG. 6 is a schematic representation of the bearing support assembly of FIG. 3, illustrating the spring stiffness of the squirrel cage and radial wave spring schematically, according to an embodiment.

The single and parallel aspects of the stiffness levels provided by squirrel cage 104 and wave spring 124 are illustrated schematically in FIG. 6. The stopper indicated in FIG. 6 represents the cylindrical portion of squirrel cage 104 that bottoms out on damper sleeve 116 in certain conditions. In such circumstances, the spring constant of squirrel cage 104 is supplemented by the spring constant of wave spring 124, as indicated schematically by the coil springs in FIG. 6. As the equilibrium conditions begin to prevail in the example above, the squirrel cage disengages from damper sleeve 116 and the parallel spring mode of the two springs is disengaged.

While shown and described in the exemplary context of rotary shafts for gas turbine engines, those skilled in the art will readily appreciate that the systems and methods disclosed herein can be used in any other suitable application without departing from the scope of this disclosure. Those skilled in the art will readily appreciate that while described and shown in the exemplary context of wave spring 124 being a full or complete ring, the ring can be split or incomplete, i.e. with an axial slot, and can even be separated into multiple circumferential ring segments as needed for specific applications.

The methods and systems of the present disclosure, as described above and shown in the drawings, provide for bearing support with superior properties including nonlinear support stiffness for providing appropriate levels of stiffness as needed. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bearing support assembly comprising:

a squirrel cage defining a longitudinal axis and including a cylindrical portion defining a bearing seat, wherein the squirrel cage is configured to provide a first level of radial support stiffness between a housing and a bearing seated in the bearing seat;

a damper sleeve operatively coupled to the cylindrical portion of the squirrel cage through a fluid film to dampen relative radial motion between the damper sleeve and the squirrel cage; and a radial spring component operatively connected to a side of the damper sleeve radially opposite the cylindrical portion of the squirrel cage to provide a second level of radial support stiffness.

2. A bearing support assembly as recited in claim 1, further comprising a housing, wherein the squirrel cage is mounted to the housing with the damper sleeve and radial spring component radially between the housing and the cylindrical portion of the squirrel cage, with the radial spring component positioned radially between the damper sleeve and the housing to radially bias the damper sleeve apart from the housing to provide the second level of radial support stiffness.

3. A bearing support assembly as recited in claim 1, further comprising an axially spaced apart pair of seal rings sealing a damper fluid chamber defined between the squirrel cage and the damper sleeve.

4. A bearing support assembly as recited in claim 3, wherein the damper sleeve includes a recessed channel that forms part of the damper fluid chamber configured to provide fluid storage within the damper fluid chamber.

5. A bearing support assembly as recited in claim 4, wherein the squirrel cage defines a step adjacent to each seal ring to ensure a minimum oil film thickness in adverse conditions in which the squirrel cage and the damper sleeve come into contact.

6. A bearing support assembly as recited in claim 1, wherein the radial spring component is an annular wave spring with a plurality of radially outer lands for pressing outward, and a plurality of radially inner lands for pressing inward, wherein the inner lands alternate circumferentially with the outer lands.

7. A bearing support assembly as recited in claim 1, wherein the squirrel cage has a spring constant lower than that of the radial spring component for applying the first level of radial stiffness support before the second level of radial stiffness support.

8. A bearing support assembly as recited in claim 1, wherein the radial spring component is a wave spring and the wave spring is one of: a complete wave ring, a split wave ring, and a circumferentially segmented wave ring.

9. A bearing support assembly comprising:

a housing;

a squirrel cage mounted to the housing, the squirrel cage defining a longitudinal axis and including a cylindrical portion defining a bearing seat;

a bearing seated in the bearing seat, wherein the squirrel cage is configured to provide a first level of radial support stiffness between the housing and the bearing;

a damper sleeve operatively connected radially outward of the cylindrical portion of the squirrel cage to dampen relative radial motion between the damper sleeve and the squirrel cage; and a radial spring component operatively connected radially between the housing and the damper sleeve to provide a second level of radial support stiffness.

10. A bearing support assembly as recited in claim 9, further comprising an axially spaced apart pair of seal rings sealing a damper fluid chamber defined between the squirrel cage and the damper sleeve.

11. A bearing support assembly as recited in claim 10, wherein the damper sleeve includes a recessed channel that forms part of the damper fluid chamber configured to provide fluid storage within the damper fluid chamber.

12. A bearing support assembly as recited in claim 9, wherein the radial spring component is an annular wave spring with a plurality of radially outer lands for pressing outward against the housing, and a plurality of radially inner lands for pressing inward against the bearing sleeve, wherein the inner lands alternate circumferentially with the outer lands.

13. A bearing support assembly as recited in claim 9, wherein the squirrel cage has a spring constant lower than that of the radial spring component for applying the first level of radial stiffness support before the second level of radial stiffness support.

* * * * *